(12) United States Patent
McGee et al.

(10) Patent No.: US 6,709,008 B2
(45) Date of Patent: Mar. 23, 2004

(54) RETRACTABLE TETHERING DEVICE FOR CURTAIN AIRBAG

(75) Inventors: Robert F. McGee, Davisburg, MI (US); James N. Sonnenberg, Royal Oak, MI (US); John Sonnenberg, Holly, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/996,022

(22) Filed: Nov. 19, 2001

(65) Prior Publication Data

US 2003/0094800 A1 May 22, 2003

(51) Int. Cl.[7] .......................... B60R 21/22; B60R 21/24
(52) U.S. Cl. ................... 280/729; 280/730.2; 280/743.2
(58) Field of Search ........................... 280/729, 730.2, 280/730.1, 743.2, 743.1

(56) References Cited

U.S. PATENT DOCUMENTS

| | | | |
|---|---|---|---|
| 5,865,462 A | | 2/1999 | Robins et al. |
| 5,887,894 A | * | 3/1999 | Castagner et al. ....... 280/743.2 |
| 5,941,564 A | | 8/1999 | Acker |
| 6,010,149 A | | 1/2000 | Riedel et al. |
| 6,095,551 A | * | 8/2000 | O'Docherty ............. 280/730.2 |
| 6,099,029 A | | 8/2000 | Haland et al. |
| 6,224,091 B1 | * | 5/2001 | Eyrainer et al. ......... 280/730.2 |
| 6,237,943 B1 | * | 5/2001 | Brown et al. ............ 280/730.2 |
| 6,290,253 B1 | | 9/2001 | Tietze et al. |
| 6,367,836 B1 | * | 4/2002 | Tanase et al. ............ 280/730.2 |
| 6,371,512 B1 | * | 4/2002 | Asano et al. ............ 280/730.2 |
| 6,390,501 B1 | * | 5/2002 | Greib et al. ............. 280/743.2 |
| 6,412,810 B1 | * | 7/2002 | Wipasuramonton et al. ..... 280/730.2 |
| 2002/0053785 A1 | * | 5/2002 | Pausch et al. ........... 280/730.2 |

FOREIGN PATENT DOCUMENTS

| | | |
|---|---|---|
| GB | 2324068 | 10/1998 |
| JP | 10-278723 | * 10/1998 |

* cited by examiner

*Primary Examiner*—Peter C. English
(74) *Attorney, Agent, or Firm*—James D. Erickson; Sally J. Brown

(57) ABSTRACT

An air-bag arrangement for use in a motor vehicle, secured to the vehicle at points along a non-linear line above an opening in the vehicle. The arrangement incorporates an inflatable element, connectors to secure an edge part of the inflatable element to the vehicle, and an inflator to inflate the inflatable element. The invention also incorporates a tether arrangement including a first and second tether. The first tether has opposed ends secured to the inflatable element. The second tether has a first end associated with the first tether intermediate its ends and a second end secured to the motor vehicle. When the inflatable element is inflated, a lower region of the inflatable element and the tethers extend between two opposed ends of the non-linear line and are substantially taut.

20 Claims, 7 Drawing Sheets

RETRACTABLE TETHERING DEVICE FOR CURTAIN AIRBAG

BACKGROUND OF THE INVENTION

1. Field of the Invention

The present invention relates to an air-bag arrangement. More specifically, the present invention relates to an air-bag arrangement for use in a motor vehicle such as an automobile.

2. Description of Related Art

There have been many proposals concerning air-bag arrangements to be utilized in motor vehicles, such as automobiles. In particular, it has been proposed to provide an air-bag arrangement in the form of an inflatable curtain that, when inflated, is located adjacent a driver or occupant of a vehicle, being positioned between the driver or occupant of the vehicle and the adjacent door or window opening.

Typically, an inflatable curtain of this type is initially stored within a housing or recess that follows a non-linear path across the top of the doorframe of the motor vehicle. The forward end of the recess or housing may extend down the "A"-Post of the motor vehicle, and the rear end of the recess or housing may extend partly down the "C"-Post or a post located to the rear of the "C"-Post.

In the event that an accident should occur, typically a side-impact or roll-over accident, the air-bag within the housing or recess is inflated, and the air-bag then forms a curtain extending parallel with the longitudinal axis of the vehicle. The curtain is substantially vertical and extends from the roof line, above the door or window opening, to a position located at the lower edge of the window opening or substantially in alignment with the center of the chest of the driver or occupant of the vehicle.

In many accident situations, the window glass is broken during the very first moments of the accident. Consequently, the inflatable curtain itself must have the necessary characteristics to retain the head, arms, and hands of the driver or occupant within the motor vehicle. Therefore, it is desirable for the lower-most region of such an inflatable curtain to be taut when the air-bag has been inflated, so that the complete side curtain constitutes a substantially rigid element that will prevent the head, arms, and hands of the driver or occupant of the vehicle from passing laterally outward through the window of the motor vehicle.

Various attempts have been made to develop a side curtain of this type that can be fabricated in such a way that when the side curtain is deployed, the lower-most region of the side curtain is substantially taut so that the curtain exhibits the desired characteristics.

One example proposes utilizing a strap that extends from the lower-most edge of the inflatable curtain, at a point adjacent one end of the inflatable curtain, to an anchoring point, for example on the "A"-Post of the motor vehicle. The strap in that example is inflatable so that the length of the strap may be reduced on deployment of the inflatable curtain. The length of the strap is such that the inflatable curtain, together with the strap in its fully extended condition, can be stored within the non-linear housing or recess that extends above the door opening and partway down the "A"-Post. However, on deployment of the inflatable curtain, the inflation of the strap causes the length of the strap to be reduced, thus enabling the strap to apply a tensioning force to one end of the inflatable curtain pulling the curtain taut. The inflatable curtain itself typically incorporates a plurality of separate cells that have axes that generally intersect the lower edge of the inflatable curtain so that, on inflation of the inflatable cells, the overall length of the lower-most edge of the inflatable curtain is reduced, thus enhancing the tensioning effect.

The use of an inflatable strap is undesirable, since it is relatively expensive to fabricate an inflatable strap, and, on deployment of the inflatable curtain, the inflation of the strap consumes gas that could more usefully be employed in inflating the inflatable part of the inflatable curtain.

SUMMARY OF THE INVENTION

According to the present invention, an air-bag arrangement is provided for use in a motor vehicle. The arrangement incorporates an inflatable element having an inflatable part and an edge part, connectors to secure the edge part of the inflatable element to a motor vehicle, and an inflator adapted to inflate the inflatable part of the inflatable element. The air-bag arrangement also incorporates a tether arrangement that includes a first and second tether of elongated form. The first tether has opposed ends secured to the inflatable element, such that the opposed ends may be adjacent each other when the inflatable element is un-inflated, and spaced apart when the inflatable element is inflated. The second tether has a first and second end. The first end associates with the first tether intermediate its ends. The second end is secured to the motor vehicle.

Preferably, the inflatable part of the inflatable element incorporates a plurality of discrete inflatable cells.

Additionally, it is preferable that the inflatable part of the inflatable element is initially in a folded condition such that the two opposed ends of the first tether are located adjacent one another.

Conveniently, one tether arrangement is provided adjacent one end of the air-bag arrangement.

An additional tether arrangement is optionally provided adjacent an opposing end of the air-bag arrangement.

Preferably, the air-bag arrangement is mounted within a motor vehicle. An edge part of the inflatable element and the second end of the second tether may be secured to the motor vehicle at points extending along a non-linear line located above an opening in the vehicle. The second end of the second tether is secured to a point located adjacent one end of the non-linear line.

Advantageously, when the inflatable element is inflated, a lower region of the inflatable element and the tethers are substantially taut and extend between two opposed ends of the non-linear line. The tautness in the inflatable element provides it with substantial rigidity, allows it to maintain its position if the adjacent windows break, and prevents the driver or occupant of the motor vehicle from passing through the opening in the vehicle.

Alternatively, the invention also provides an air-bag arrangement provided in a motor vehicle, the air-bag arrangement comprising a non-linear recess spanning at least one opening in the motor vehicle. The recess contains a tether arrangement and an initially folded inflatable element having one edge secured to said recess. The tether arrangement includes a first and second elongated tether. The first tether has opposed ends secured to the inflatable element, such that the opposed ends may be adjacent each other when the inflatable element is un-inflated and spaced apart when the inflatable element is inflated. The second tether has a first and second end. The first end of the second tether associates with the first tether intermediate its ends.

The second end is secured to the motor vehicle at one end of the non-linear recess. The air-bag arrangement further includes an inflator adapted to inflate the inflatable part of the inflatable element. The arrangement is such that, on inflation of the inflatable element, a lower part of the inflatable element, substantially aligned with a line interconnecting two ends of the non-linear recess, is substantially taut.

DETAILED DESCRIPTION OF THE PREFERRED EMBODIMENTS

Figure 1:
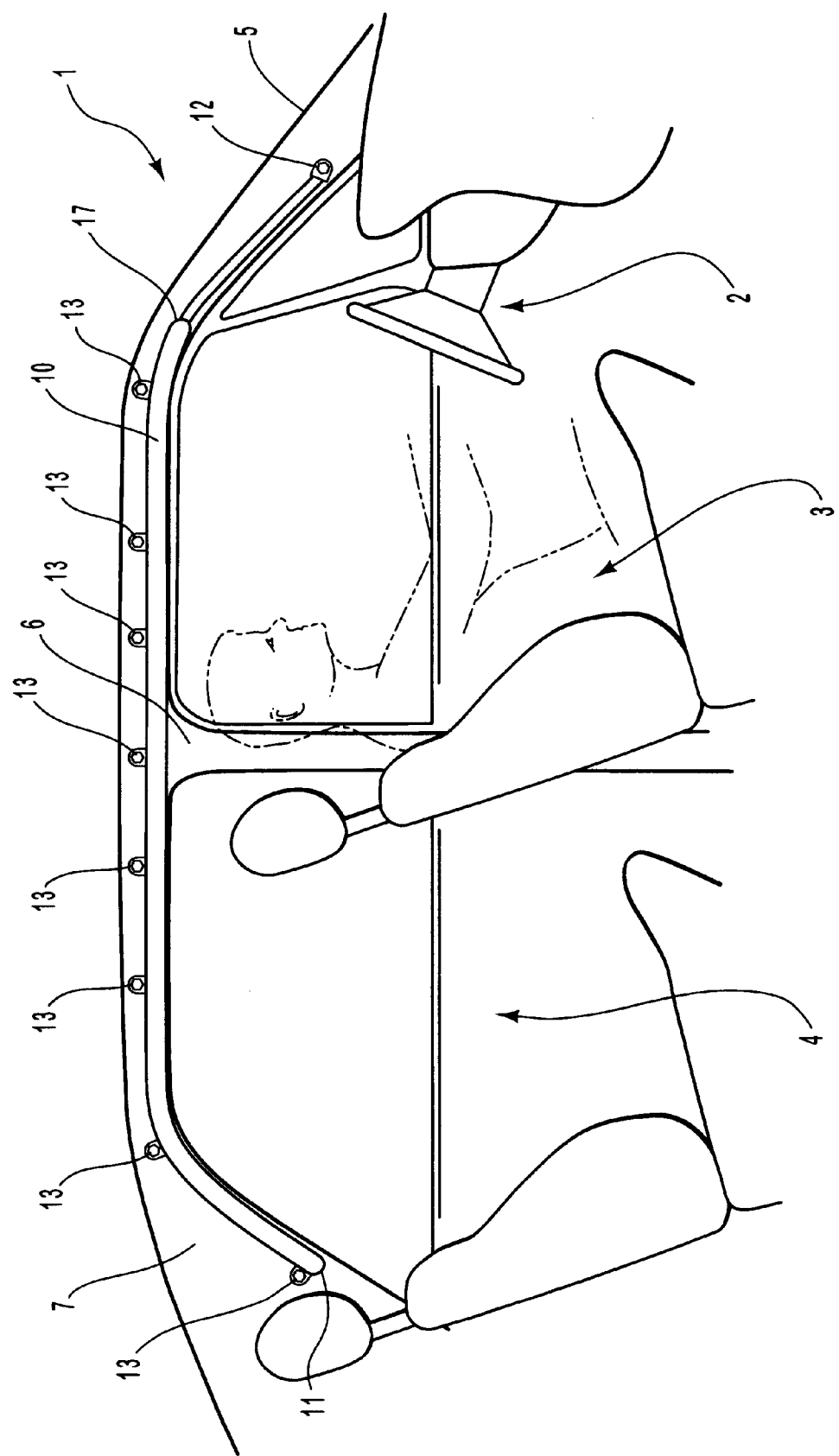
FIG. 1 is a diagrammatic view illustrating the interior of a motor vehicle, in the form of an automobile, provided with an air-bag arrangement in accordance with the invention, showing the air-bag arrangement in the un-deployed state.

Referring to FIG. 1 of the accompanying drawings, part of a motor vehicle 1 is illustrated, the illustrated part of the vehicle incorporating a front door 2, located adjacent the driver 3 of the vehicle 1, and a rear door 4. A window is provided in each door. An "A"-Post 5 is provided towards the front part of the front door 2, a "B"-Post 6 is provided between the front door 2 and the rear door 4, and a "C"- Post 7 is provided to the rear of the rear door 4.

A housing 10 is provided that extends from a point 11 on the "C"-Post 7, across the top of the rear door 4, across the top of the front door 2, and down the "A"-Post 5 to a point 12. The housing is non-linear.

The housing 10 is provided with a plurality of connectors 13, shown in FIG. 1 as anchoring tabs, which may be spaced along the length of the housing. Each connector is secured to part of the roof of the motor vehicle so that the housing is retained in the illustrated position. The housing 10 defines an internal recess that accommodates an air-bag arrangement.

The housing 10 contains, in an initial folded condition, an inflatable element 14 (see FIG. 2), and the forward-most part of the housing contains two tethers 15 and 16 that will be described hereafter in greater detail.

The inflatable element 14 has a non-linear edge part and an inflatable part that is generally of rectangular form. The edge part of the inflatable element 14 is secured to the roof of the vehicle by the connectors 13 along a line which extends from the point lion the "C"-Post of the motor vehicle, to a point 17 (see FIG. 2) located on the upper-most part of the "A"-Post 5.

The main inflatable part of the inflatable element 14 comprises two adjacent layers of fabric, selected regions of which may be inter-connected, preferably using a one-piece-weaving technique, to form seams that define a plurality of discrete inflatable cells. For example, towards the rear of the inflatable element 14, in the region 18, the inflatable element defines a plurality of substantially vertically extending, discrete inflatable cells 19. The cells 19 are arranged so that the longitudinal axis of each cell substantially intersects the lower-most edge 20 of the inflatable element. It will be appreciated that the lower edge of each cell 19 need not be at the same height, relative to the edge 20 of the inflatable element 14. In an intermediate region 21 no cells are provided, and towards the front of the inflatable element, in a further region 22, again a plurality of adjacent, discrete inflatable cells 23 are provided. The cells 23 are arranged so that the axis of each cell intersects the lower-most edge 20 of the inflatable element 14. Again, the lower edge of each cell 23 need not be at the same height relative to the edge 20 of the inflatable element 14.

Figure 2:
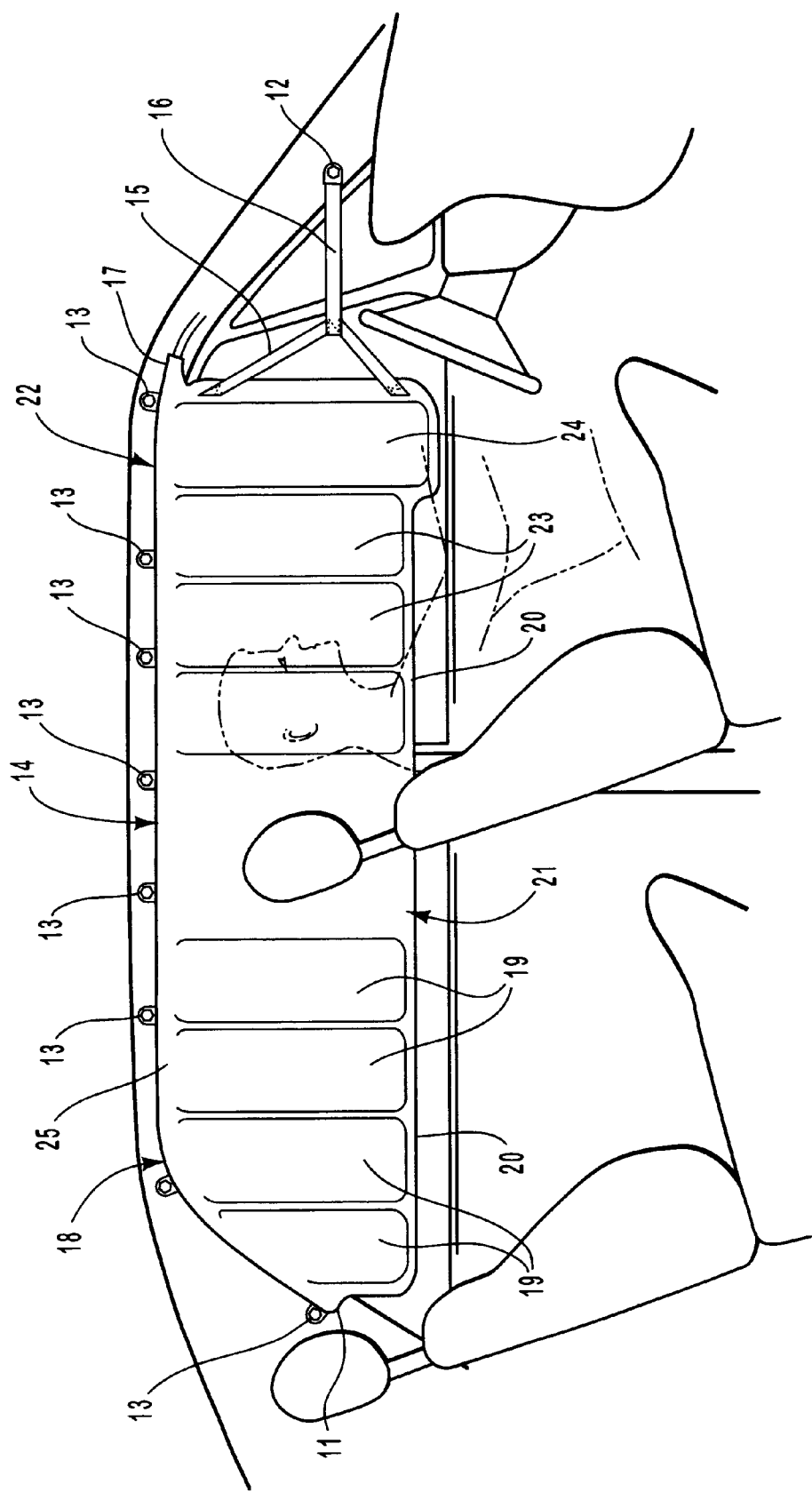
FIG. 2 is a view corresponding to FIG. 1, but illustrating the airbag in the deployed state.

It is to be noted that, towards the front end of the inflatable element, there may be provided at least one discrete inflatable cell 24 of greater length than the remaining inflatable cells 23. Thus, the lower-most part of the cell 24, when the inflatable element is deployed (as shown in FIG. 2), may be positioned beneath the lower-most edge 20 of the rest of the inflatable element. Although cell 24 is shown having a greater length than the remaining inflatable cells 23, it will be appreciated that cell 24 may have a length substantially equal to the remaining cells 23.

The upper part of the inflatable element is provided with a fill tube 25 that communicates with an inflator (not shown), such as a gas generator. The inflator is adapted to be actuated in response to an accident, such as a side impact or a roll-over accident. Suitable inflators are known in the art. The fill tube 25 also communicates with each of the cells 19, 23, and 24 of the inflatable element.

Figure 3:
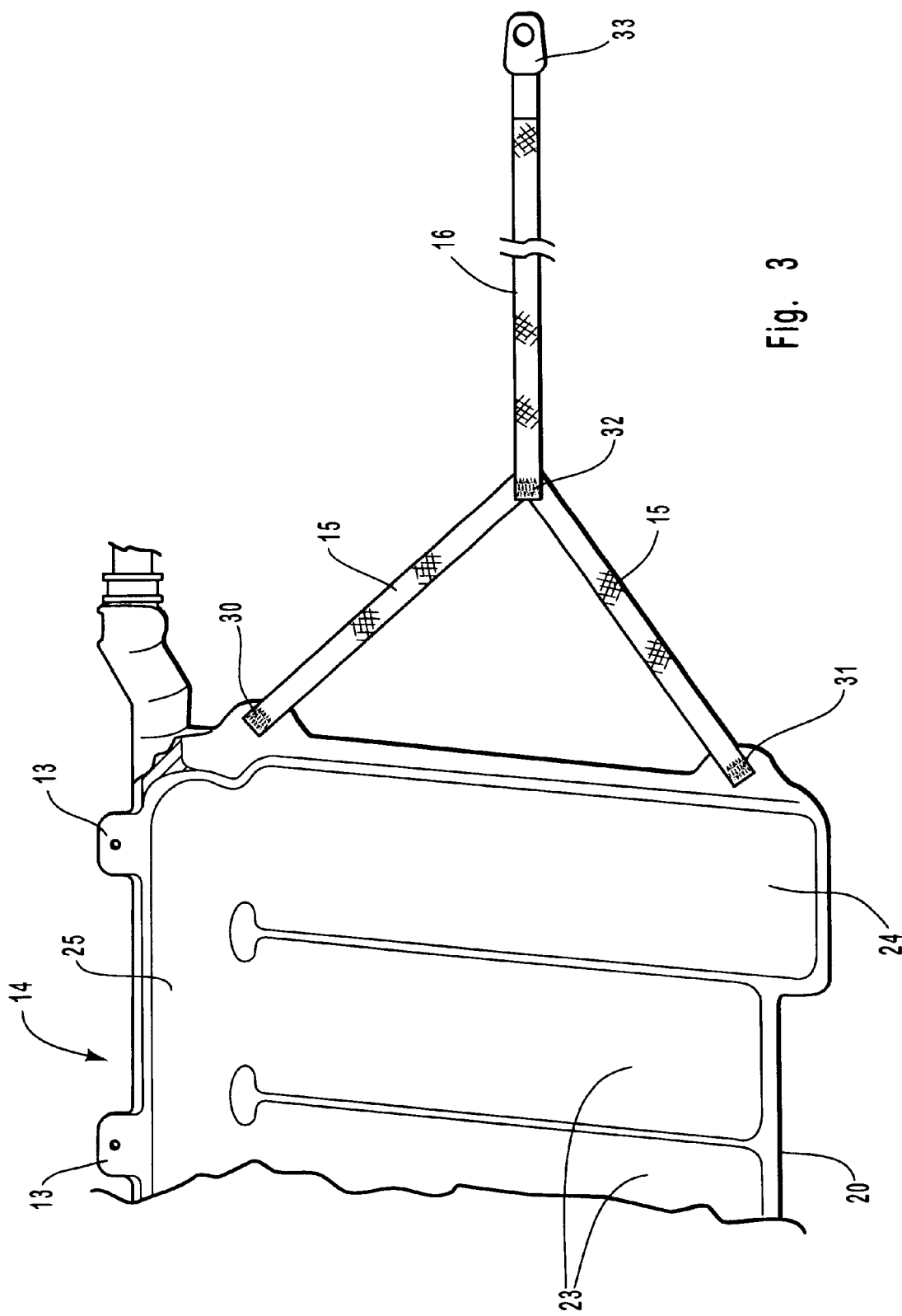
FIG. 3 is an enlarged view of part of FIG. 2 illustrating, more clearly, the tethering straps.

Referring to FIG. 3 in the accompanying drawings, a first tether 15 is provided towards the front of the inflatable element. The tether 15, shown in FIG. 3 as an elongated strap, has an upper end 30 secured to the inflatable part of the inflatable element 14 adjacent the roof line, and has a lower end 31 secured to the lower-most part of the cell 24 provided at the forward end of the inflatable part of the inflatable element 14.

Figure 4:
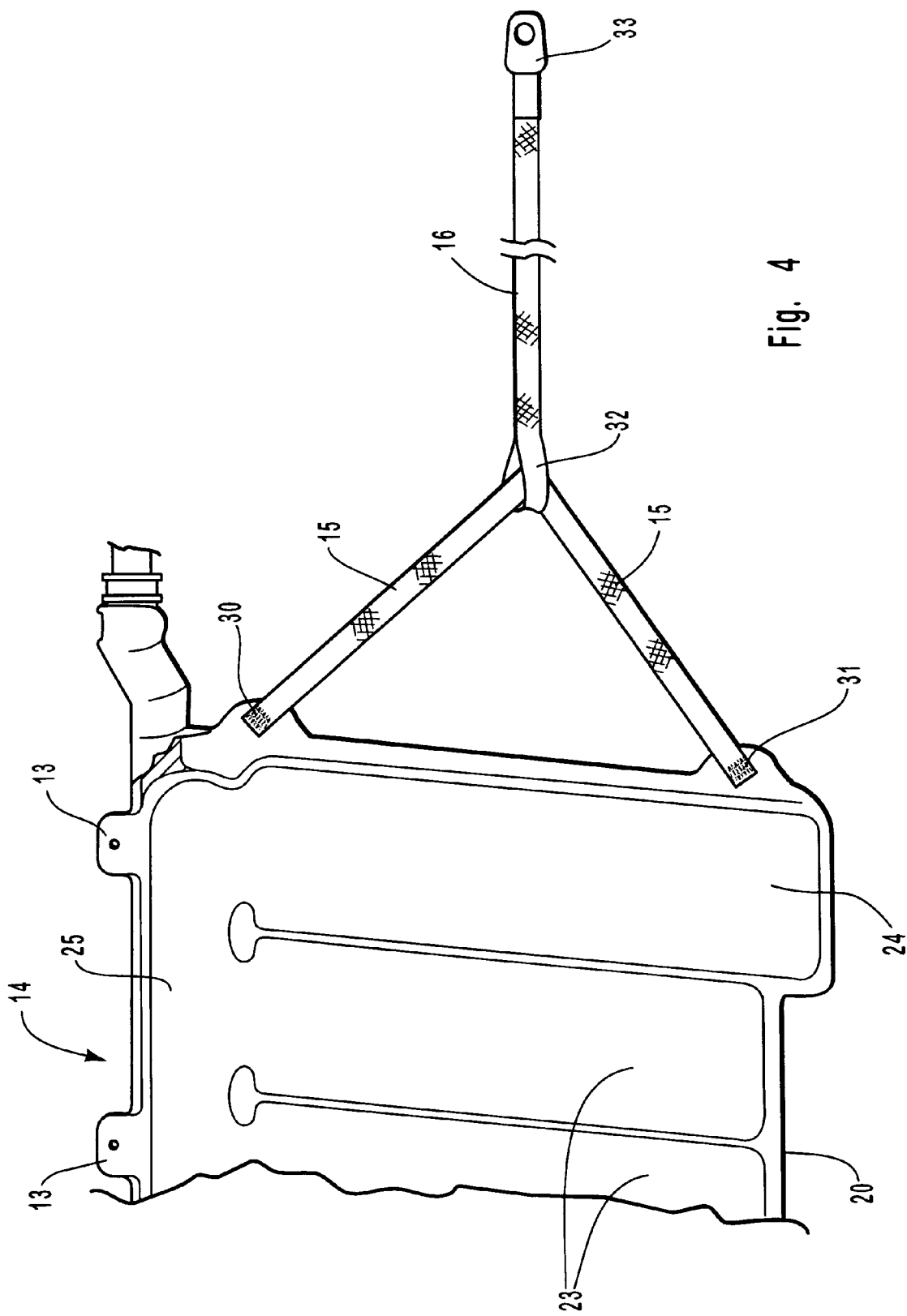
FIG. 4 is an enlarged view of part of FIG. 2 illustrating, more clearly, an alternative embodiment of the association between the tethers.

A second tether 16, shown in FIG. 3 as an elongated strap, is provided having a first and second end. The first end 32 is associated with the first tether 15 between the ends 30 and 31 thereof. The association at the first end 32 may be a permanent connection, formed by stitching, one-piece-weaving, or bonding. The association at the first end 32 may optionally comprise a loop formed at one end of the tether 16, the loop embracing the tether 15 so that the loop may slide along the tether 15 (see FIG. 4). The second end 33 of the second tether 16 is secured to the point 12 on the "A"-Post 5 of the motor vehicle.

The tether arrangement within the scope of the present invention need not always be secured to the forward end of cell 24. The tether may be secured between the first cell 24 and its adjacent cell 23 to obtain higher tension to the air-bag arrangement.

Figure 5A:
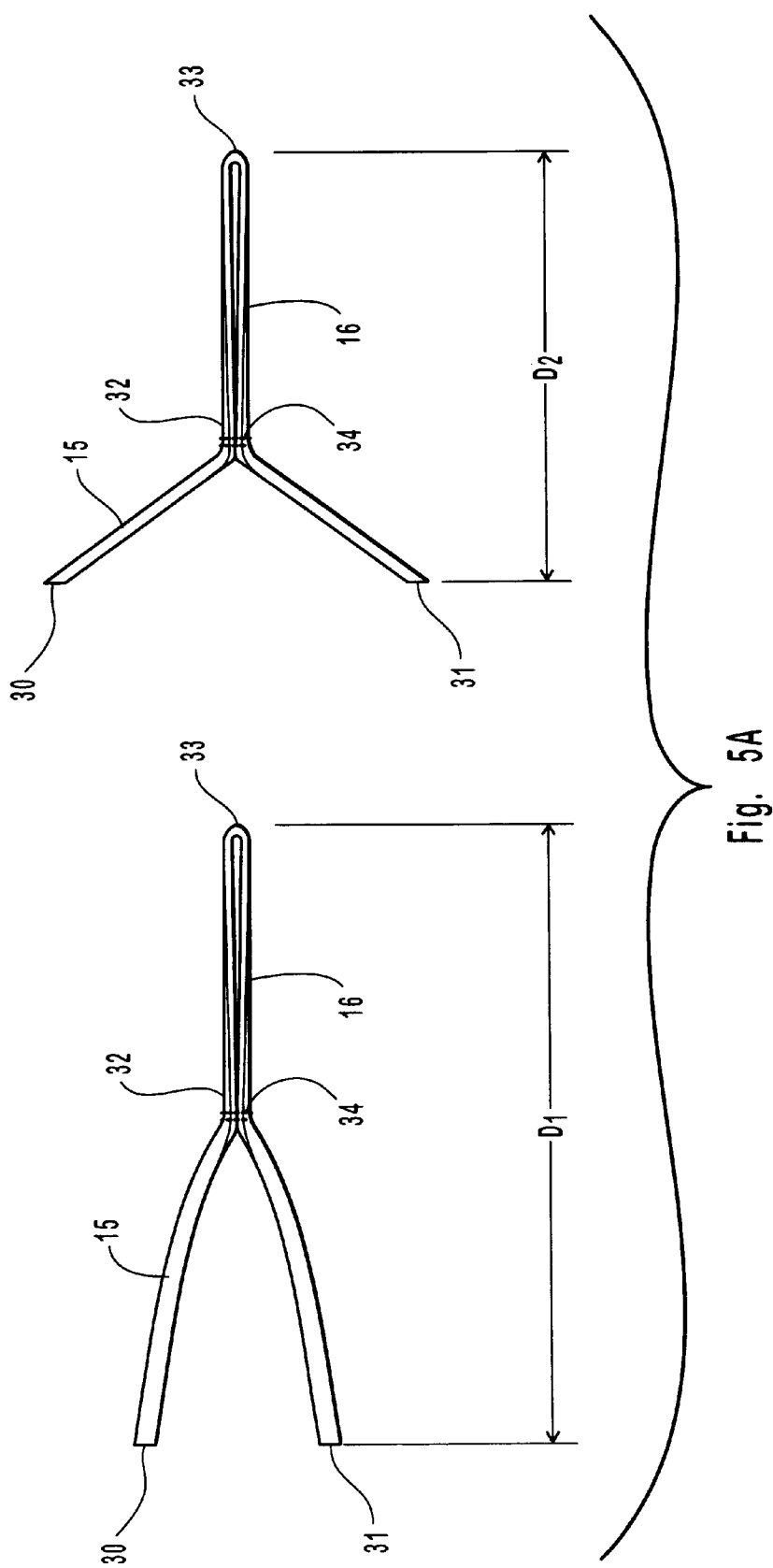
FIG. 5A is a view of the tether arrangement in un-inflated and inflated conditions showing the differences in effective overall lengths.

It will be appreciated that the tethers 15, 16 may or may not be constructed of a single piece of material. FIG. 5A, for instance, illustrates tethers 15, 16 constructed of a single piece of material, secured at the first end 32 by stitching 34. Persons having ordinary skill in the art will appreciate that the stitching 34 may be replaced by alternative forms of chemical or mechanical bonding.

It is to be observed that when the described air-bag arrangement is within the housing 10 before deployment of the inflatable element, the main inflatable part of the inflatable element may be folded. Consequently, the two opposed ends 30 and 31 of the tether 15 may be located adjacent one another. The tether 15 itself is effectively folded in half, with the association between the first end 32 of tether 16 and tether 15 being located substantially at the mid-point of tether 15. The combination of the length of the lower edge of the inflatable element, the effective length of the first tether 15, and the length of the second tether is the effective overall length of the air-bag arrangement. The effective overall length of the arrangement when the air-bag is un-inflated is such that the arrangement may be contained within the housing.

When the air-bag arrangement is mounted in a motor vehicle, the inflatable element is deployed when the inflator is activated in response to an accident, typically a side impact or roll-over accident. When the inflator is activated, gas passes along the fill tube 25 and inflates the cells 19, 23, and 24. The inflatable element thus moves from the stored position within the housing to the deployed position as shown in FIG. 2. As the forward-most cell 24 inflates, the opposed ends 30 and 31 of the first tether 15 are moved apart, with the consequence that the first tether is moved towards a linear condition. Consequently, the effective overall length of the lower-most edge of the inflatable element and the tethers is reduced.

Figure 5B:
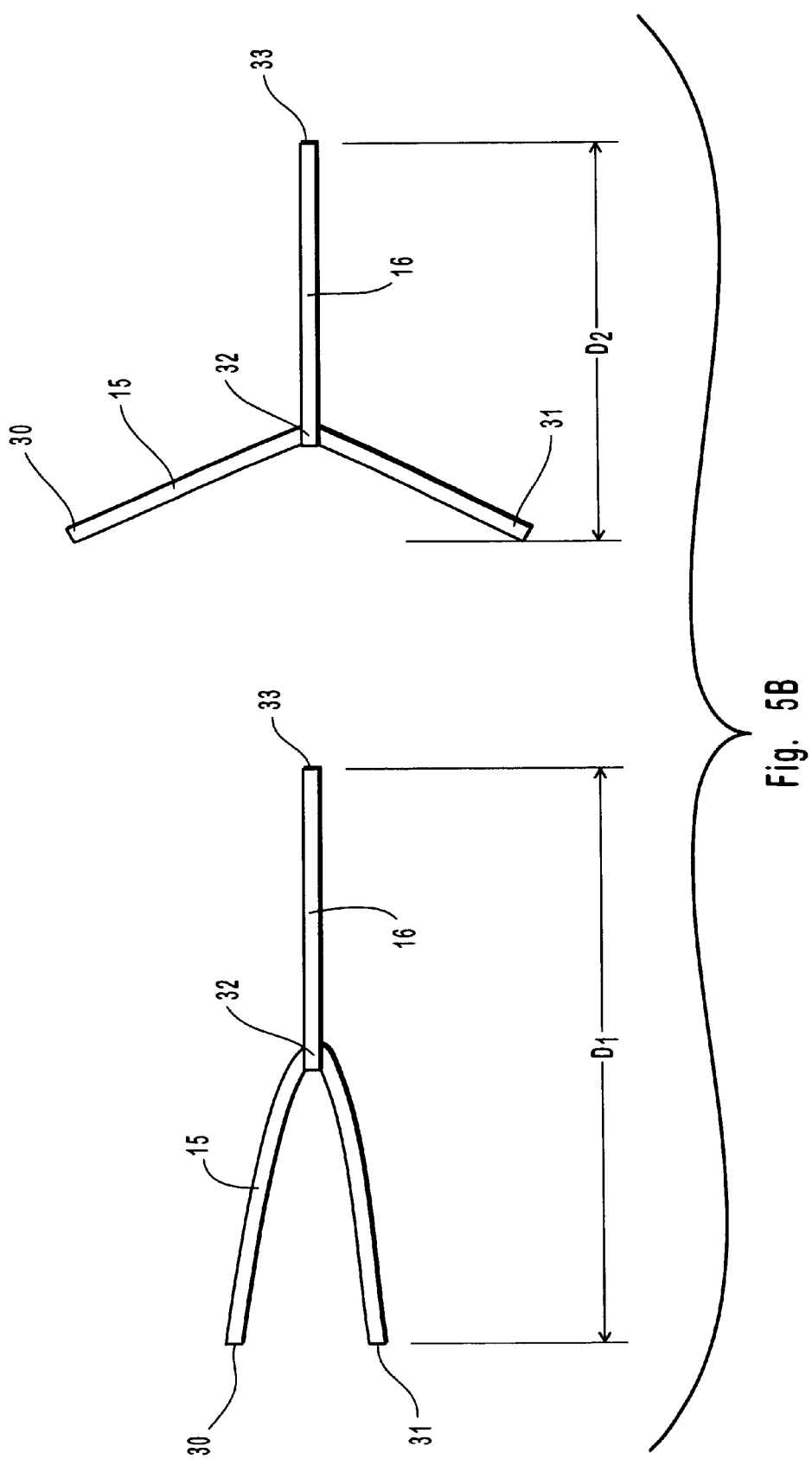
FIG. 5B is a view of another tether arrangement in un-inflated and inflated conditions showing the differences in effective overall lengths.

The difference in effective overall length between the air-bag arrangement in the stored position and in the deployed position is shown in FIGS. 5A and 5B as the difference between $D_1$ and $D_2$. In FIGS. 5A and 5B, $D_1$ represents the combined length of the tethers when the first tether 15 is folded and stored in the housing, and $D_2$ represents the combined length of the tethers when the inflatable element 14 is inflated and the first tether 15 is in a substantially linear condition. It is to be understood that $D_1$ is sufficient to allow the arrangement to be stored in the housing. It also should be understood that $D_2$ is such that a line of substantial tautness and rigidity is created in the lower region of the inflatable element which extends between the points 11 on the "C"-Post 7 and 12 on the "A"-Post 5. The tautness in the inflated element 14 allows it to be maintained in position even if the adjacent vehicle windows break.

It is to be observed that because the inflatable cell 24 has a greater length than the adjacent cells 23, the line of rigidity provided by the first tether 16 may be almost aligned with the physical lower-most edge 20 of the inflatable part of the inflatable element 14. However, it is quite sufficient that there be a line of tautness in the lower region adjacent the lower-most edge of the inflatable element so that the inflatable element 14 itself forms a substantially rigid, substantially non-yielding structure, when deployed. The length of the inflatable cells may or may not be equal to provide the desired line of tautness in the lower region. The substantially rigid structure prevents the head of the driver or occupant of the vehicle from being thrown outwardly through a window opening, such as the window opening in the door 2 or in the door 4.

Figure 6:
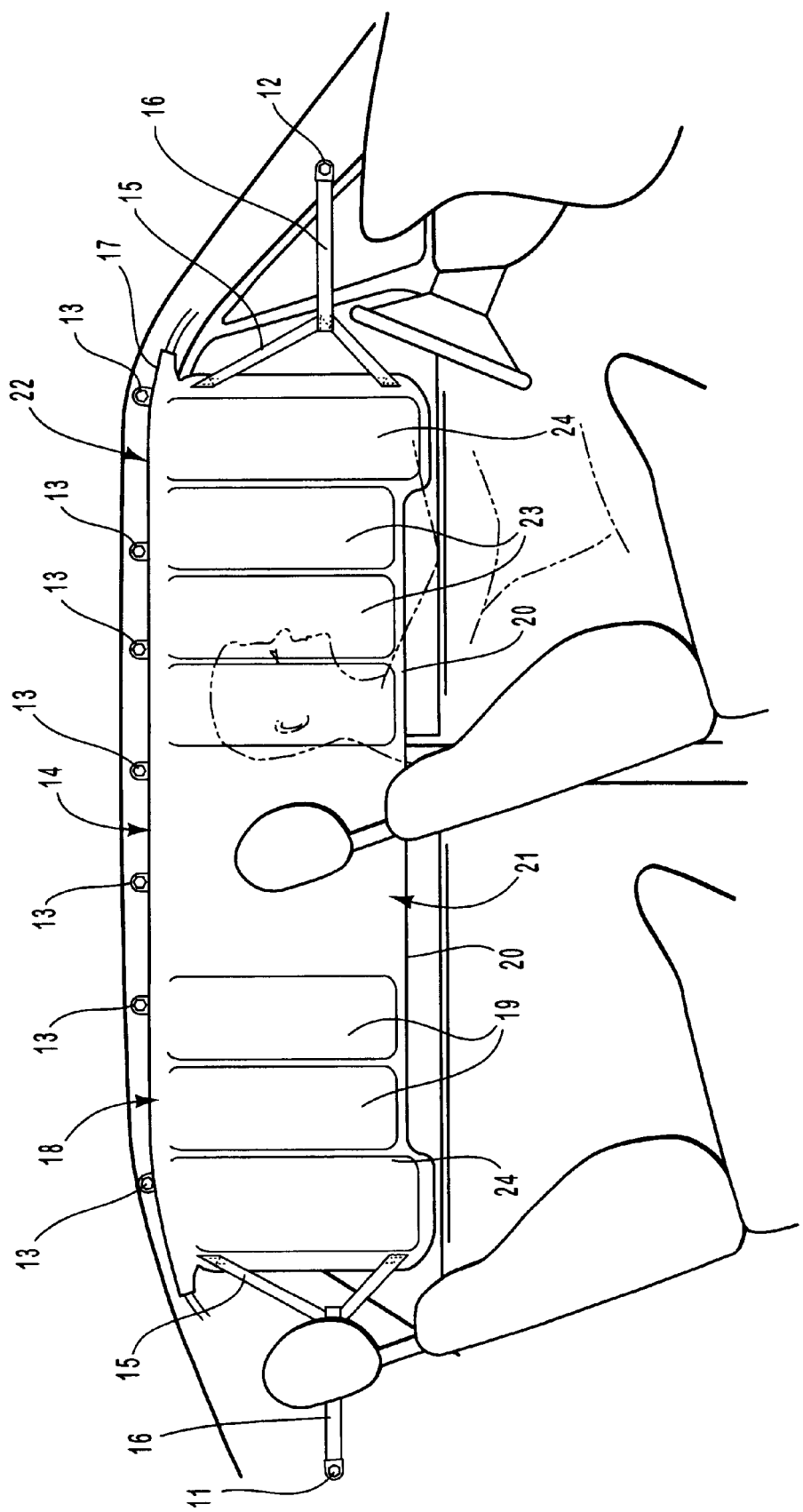
FIG. 6 is a view, corresponding to FIG. 2, showing a modified embodiment of the invention.

Whilst the present invention has been described with reference to an arrangement in which a tether arrangement is provided at the front of the inflatable element, to extend from the inflatable part of the inflatable element to a point on the "A"-Post of a motor vehicle, it is to be appreciated that in alternative embodiments of the invention, the tether arrangement may be provided at the rear of the inflatable element, thus extending to a point on the "C"-Post of the vehicle, or even, in certain circumstances, to a point on a post located to the rear of the "C"-Post. Of course, tethers of the type described may be provided both at the front and at the rear of an inflatable element, should this prove to be desirable. As shown in FIG. 6, the forward-most and rearward cells 24, 24 are both shown having a greater length than the adjacent cells 23, 19. The present invention does not require the length of cells 24, 24 to be greater than the adjacent cells. The cells may have a length substantially equal to that of the adjacent cells. The first tethers 15, 15 have their upper ends secured to the inflatable element adjacent the roofline and their lower ends secured to the inflatable element adjacent the lower-most edges of cells 24, 24. The second tethers 16, 16 have first ends associated with the first tethers 15, 15. The second tethers extend in opposite directions and have second ends secured to the motor vehicle at points 12, 11 on the "A" and "C"-Posts. A tether arrangement provided at both the front and rear of an inflatable element will pull a lower region in both directions and may cause increased tautness and rigidity.

What is claimed is:

1. An air-bag arrangement for use in a motor vehicle, the arrangement comprising:
    an inflatable element, comprising:
        an inflatable part, and
        an edge part;
    connectors to secure the edge part of the inflatable element to the motor vehicle; and
    a tether arrangement comprising:
        a first tether of elongated form having opposed ends thereof secured to the inflatable element, outside the inflatable part, such that the opposed ends adjacent each other when the inflatable element is un-inflated and spaced apart when the inflatable element is inflated, and
        a second tether having a first and second end thereof, wherein the first end comprises a loop that embraces the first tether intermediate its ends, and the second end is secured to the motor vehicle.

2. An air-bag arrangement according to claim 1 wherein the inflatable part of the inflatable element comprises a plurality of discrete inflatable cells.

3. An air-bag arrangement according to claim 1 wherein the inflatable part of the inflatable element is initially in a folded condition such that the opposed ends of the first tether are adjacent one another.

4. An air-bag arrangement according to claim 1 wherein the connectors comprise anchoring tabs.

5. An air-bag arrangement according to claim 1 wherein the loop movably embraces the first tether.

6. An air-bag arrangement according to claim 1 wherein the tether arrangement is provided adjacent one end of the inflatable element.

7. An air-bag arrangement according to claim 6 wherein the inflatable part of the inflatable element further comprises a plurality of discrete inflatable cells, and wherein the first tether of the tether arrangement is secured to a first cell of greater or equal length than the remainder of the inflatable cells.

8. An air-bag arrangement according to claim 6 further comprising an additional, substantially identical tether arrangement adjacent an opposing end of the inflatable element.

9. An air-bag arrangement according to claim 8 wherein the inflatable part of the inflatable element further comprises a plurality of discrete inflatable cells with a forward-most cell and a rearward cell, the forward-most and rearward cells being of greater or equal length than the remainder of the inflatable cells.

10. An air-bag arrangement according to claim 1 wherein the air-bag arrangement is mounted within the motor vehicle, wherein the edge part of the inflatable element and the second end of the second tether are secured to the motor vehicle at least at points extending along a non-linear line located above an opening in the vehicle, and wherein the second end of the second tether is secured at a point located adjacent one end of said non-linear line.

11. An air-bag arrangement according to claim 10 wherein the inflatable element and tether arrangement are configured such that when the inflatable element is inflated the inflated element is sufficiently rigid to prevent a driver or occupant of the motor vehicle from passing through the opening in the vehicle.

12. An air-bag arrangement according to claim 10 wherein a lower region of the inflatable element and the tethers extend between two opposed ends of said non-linear line, and the lower region and the tethers are substantially taut when the inflatable element is inflated.

13. An air-bag arrangement provided in a motor vehicle, the air-bag arrangement comprising:
   a non-linear recess spanning at least one opening in the motor vehicle, the recess containing
      an initially folded inflatable element having one edge secured to the recess, and
   a tether arrangement, the arrangement comprising:
      a first elongated tether having opposed ends thereof secured to the inflatable element, such that the opposed ends may be adjacent each other when the inflatable element is initially in a folded state and spaced apart when the inflatable element is inflated, and
      a second tether having a first and second end thereof, wherein the first end comprises a loop that embraces the first tether intermediate the opposed ends thereof, and wherein the second end of the second tether is secured to the motor vehicle at one end of the non-linear recess;
   wherein the air-bag arrangement is configured such that, on inflation of the inflatable element, a lower region of the inflatable element, substantially aligned with a line inter-connecting two ends of the non-linear recess, is substantially taut.

14. An air-bag arrangement according to claim 13 wherein the inflatable element and tether arrangement are configured such that, when the inflatable element is inflated, the inflatable element is sufficiently rigid to prevent a driver or occupant of the motor vehicle from passing through the opening of the vehicle.

15. An air-bag arrangement according to claim 13 wherein the inflatable element comprises a plurality of discrete inflatable cells.

16. An air-bag arrangement according to claim 13 wherein the tether arrangement is provided adjacent one end of the inflatable element.

17. An air-bag arrangement according to claim 16 wherein the inflatable element further comprises a plurality of discrete inflatable cells, and wherein the first tether of the tether arrangement is secured to a first cell of greater or equal length than the remainder of the inflatable cells.

18. An air-bag arrangement according to claim 16 further comprising an additional, substantially identical tether arrangement adjacent an opposing end of the inflatable element.

19. An air-bag arrangement according to claim 18 wherein the inflatable element further comprises a plurality of discrete inflatable cells with a forward-most cell and a rearward cell, the forward-most and rearward cells being of greater or equal length than the remainder of the inflatable cells.

20. An air-bag arrangement for use in a motor vehicle, the arrangement comprising:
   an inflatable element securable to the motor vehicle; and
   a tether arrangement comprising:
      a first tether of elongated form having opposed ends thereof secured to the inflatable element, outside the inflatable element, such that the opposed ends are adjacent each other when the inflatable element is un-inflated and spaced apart when the inflatable element is inflated, and
      a second tether having a first and second end thereof, wherein the first end comprises a loop that embraces the first tether intermediate its ends, and the second end is securable to the motor vehicle.

* * * * *